(No Model.) 7 Sheets—Sheet 1.

C. F. BROWN.
CASH REGISTER, INDICATOR, AND RECORDER.

No. 481,524. Patented Aug. 23, 1892.

Witnesses:
Wm. A. Schoenborn
Arthur E. Dowell

Inventor:
Chas. F. Brown
by
J. W. Alexander
atty (No Model.) 7 Sheets—Sheet 2.

C. F. BROWN.
CASH REGISTER, INDICATOR, AND RECORDER.

No. 481,524. Patented Aug. 23, 1892.

Witnesses:
Wm. A. Schoenborn.
Arthur E. Dowell.

Inventor:
Chas. F. Brown
By J. A. Alexander atty (No Model.) 7 Sheets—Sheet 3.

C. F. BROWN.
CASH REGISTER, INDICATOR, AND RECORDER.

No. 481,524. Patented Aug. 23, 1892.

Witnesses:
Wm. A. Schoenborn
Arthur E. Dowell

Inventor:
Chas. F. Brown
by
J. A. Alexander
atty (No Model.) 7 Sheets—Sheet 4.

C. F. BROWN.
CASH REGISTER, INDICATOR, AND RECORDER.

No. 481,524. Patented Aug. 23, 1892.

Witnesses:
Wm A. Schonborn
Arthur E. Sowell

Inventor:
Chas. F. Brown
by
T. S. Alexander
atty

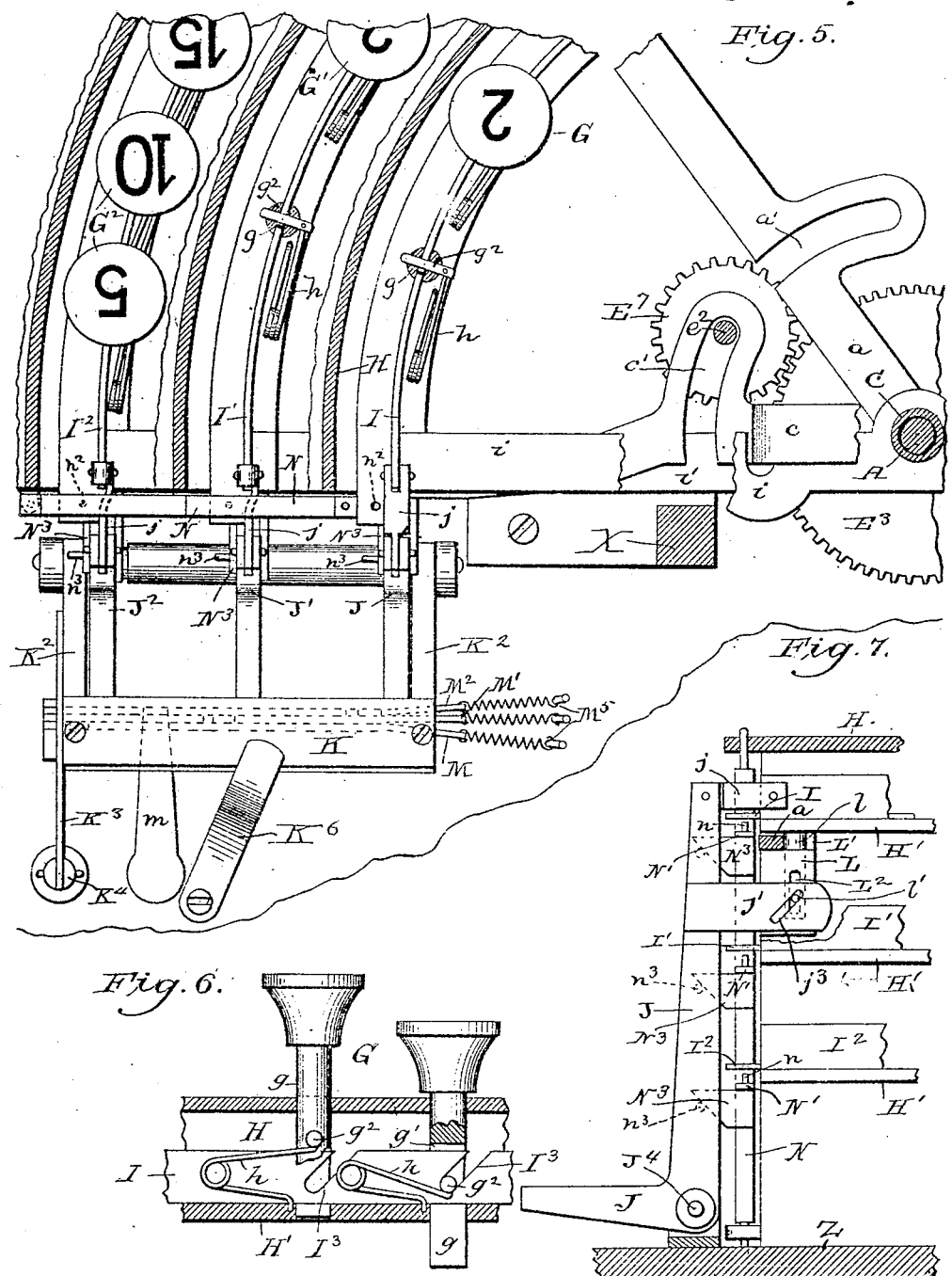

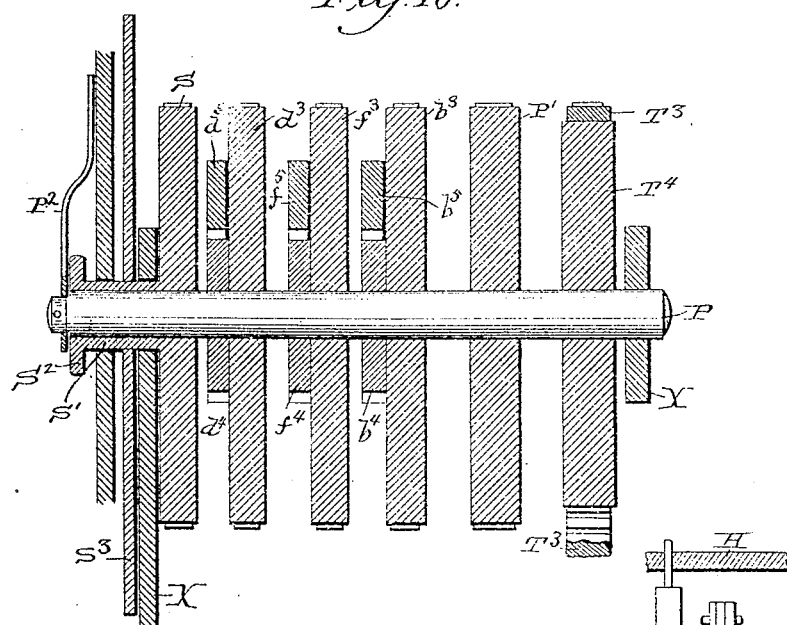
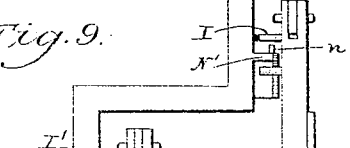
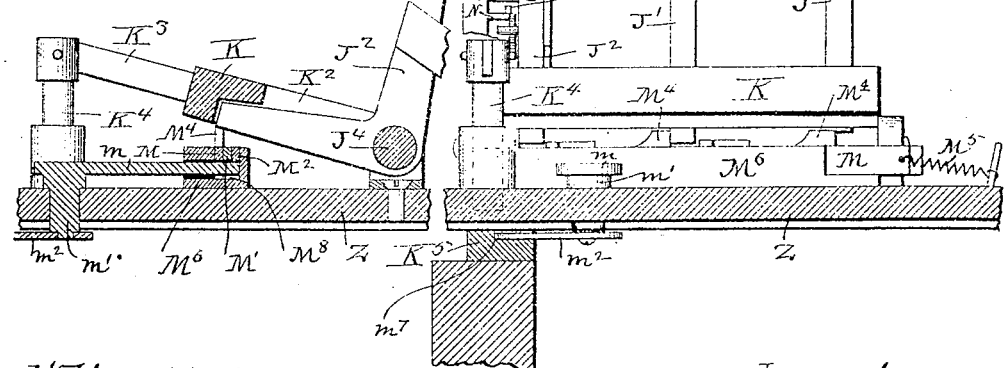

(No Model.) 7 Sheets—Sheet 7.
C. F. BROWN.
CASH REGISTER, INDICATOR, AND RECORDER.
No. 481,524. Patented Aug. 23, 1892.
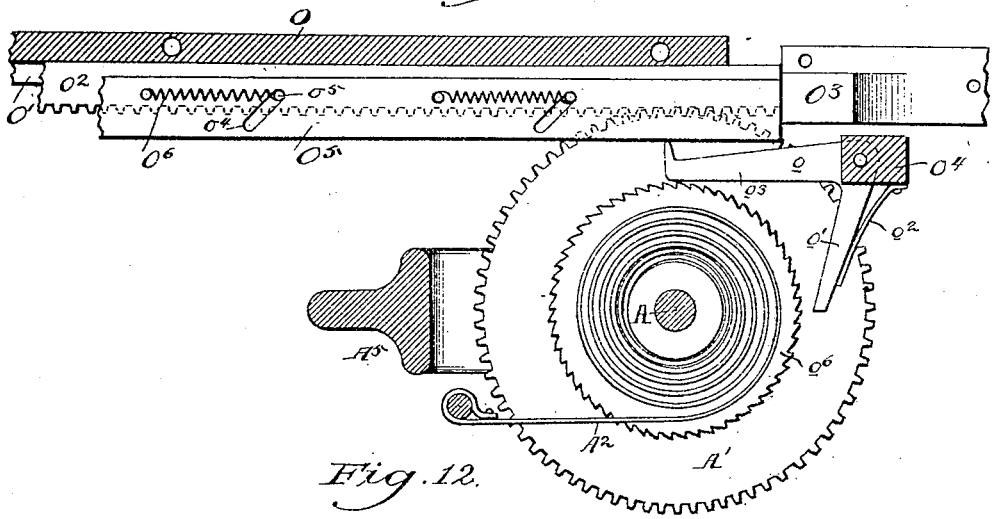
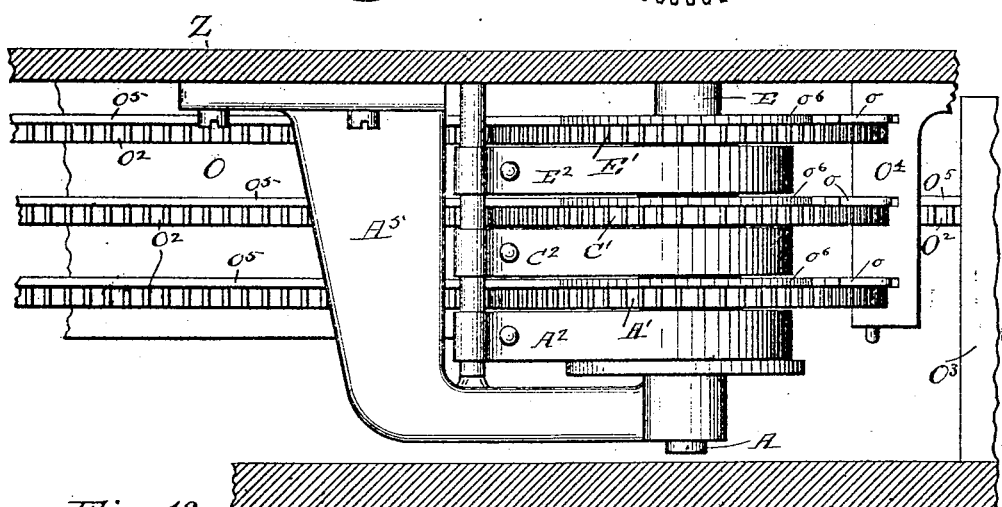
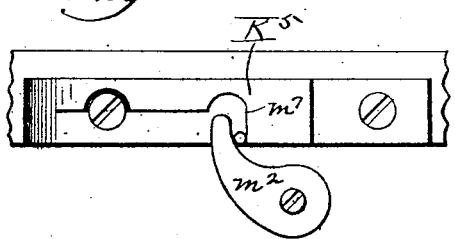
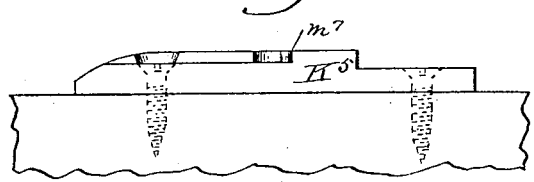
Witnesses:
Wm. A. Schoenborn
Arthur E. Sourell
Inventor:
Chas. F. Brown
by
J. H. Alexander
atty

UNITED STATES PATENT OFFICE.

CHARLES F. BROWN, OF YONKERS, NEW YORK, ASSIGNOR TO THE ROYAL MACHINE COMPANY, OF SAME PLACE.

CASH REGISTER, INDICATOR, AND RECORDER.

SPECIFICATION forming part of Letters Patent No. 481,524, dated August 23, 1892.

Application filed January 19, 1892. Serial No. 418,560. (No model.)

*To all whom it may concern:*

Be it known that I, CHARLES F. BROWN, of Yonkers, in the county of Westchester and State of New York, have invented certain new and useful Improvements in Cash Registering, Indicating, and Recording; and I do hereby declare that the following is a full, clear, and exact description thereof, reference being had to the accompanying drawings, and to the letters of reference marked thereon, which form part of this specification, in which—

Figure 1:
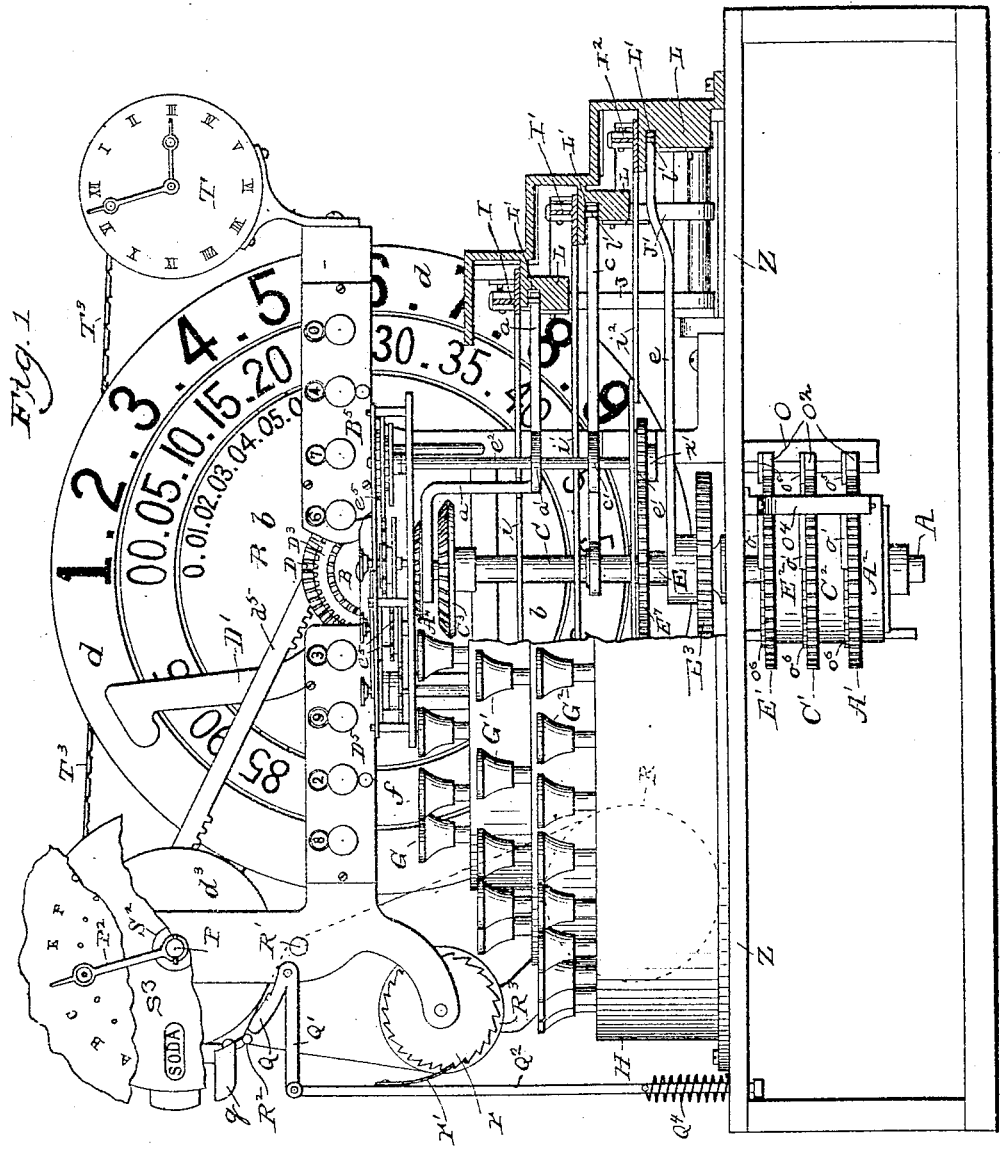
Figure 2:
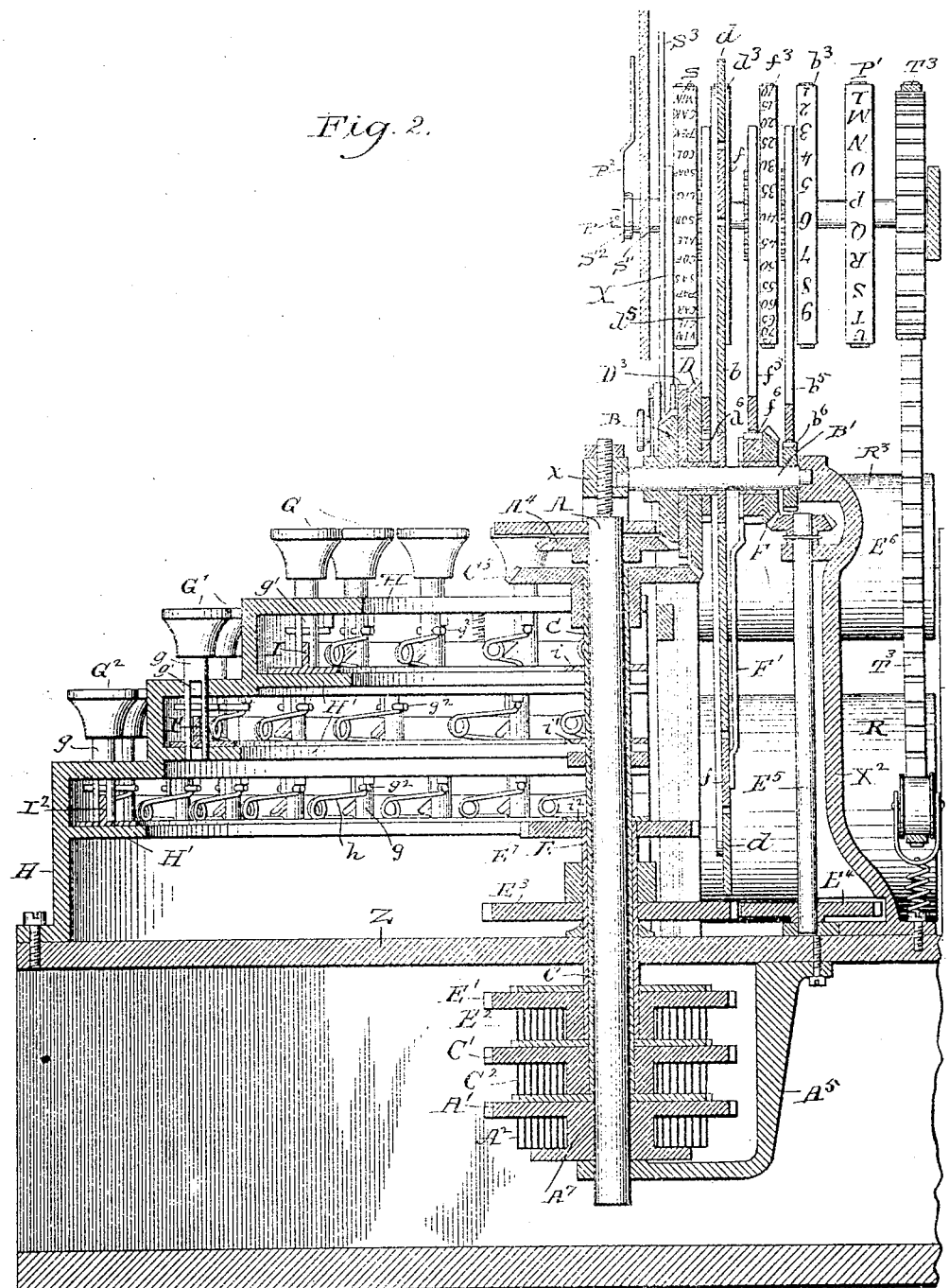
Figure 3:
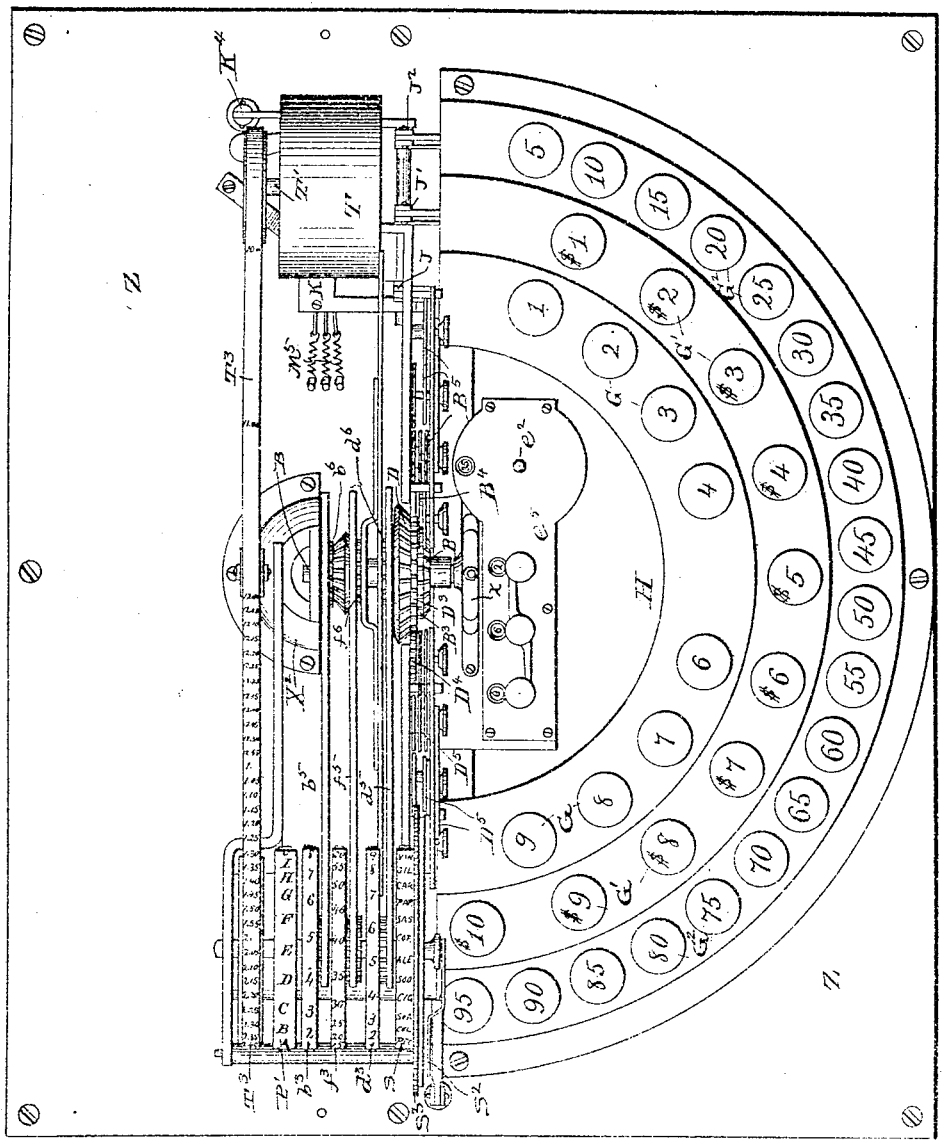
Figure 4:
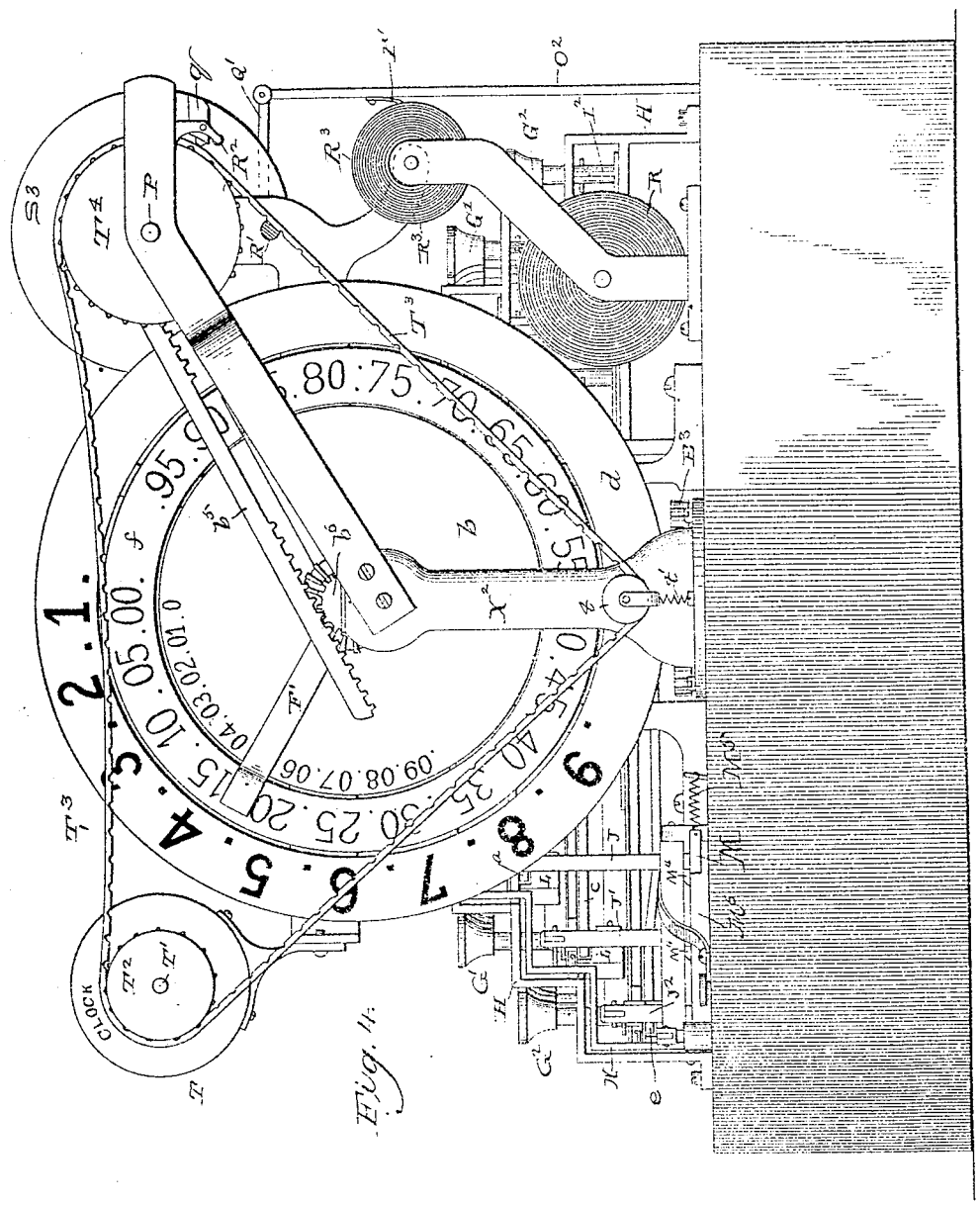

Figure 1 is a front elevation, partly in section, with the drawer and casing removed, of my improved cash register, recorder, and indicator. Fig. 2 is an enlarged vertical transverse central section through the same. Fig. 3 is a top plan view with casing removed. Fig. 4 is a rear view of Fig. 1. Fig. 5 is an enlarged plan view, partly in section, of a portion of the key-bank, showing the drawer-controlling devices and connected parts. Fig. 6 is a detail view of key-stems and pull-strap; Fig. 7, a detail side view of key-straps and key-row-locking and drawer-releasing mechanisms. Fig. 8 is an enlarged detail sectional view of the drawer-releasing devices; Fig. 9, an end view in detail of the key-bank, showing the key-row or pull-strap lock and the drawer and pull-strap locking mechanisms. Fig. 10 is an enlarged sectional view through the printing and recording wheels. Fig. 11 is an enlarged top plan view of the rebound-preventing mechanism; Fig. 12, an enlarged side view of the dial-operating mechanism. Figs. 13 and 14 are detail views of the keeper.

The object of this invention is to provide an improved registering, indicating, and recording machine for use in stores, &c., whereby a complete record of all the monetary transactions of an ordinary business—such as cash and credit sales, money paid on account, money paid out, change, charges, &c.—may be made, and also, if desired, a record kept of the kinds or classes of goods sold, the time of each transaction, and the employé conducting the transaction, and whereby the total amount of sales will be registered and the amount of each sale indicated at the time thereof.

Further specific objects are, first, to dispense with all key-levers; second, to improve the drawer-controlling devices; third, to operate the recording devices from and by the movement of the drawer; fourth, to prevent keys in the same and different rows being successively depressed while the drawer is opened; fifth, to lock each key when depressed; sixth, to make the return of dials to "0" position and the rise of the depressed key dependent upon the entire closing of the drawer, so that the drawer must be closed and opened each time a key is depressed; seventh, to record and indicate the kind of goods sold; eighth, to record the time of each sale and the amount thereof and the seller, and, ninth, to prevent rebound of the dials.

The present invention therefore consists in, first, a novel pull-strap actuated by the key-stems for releasing the drawer-bolt and which also locks the key-stem when shifted; second, a novel mechanism for locking the pull-straps when shifted until the drawer is brought back to normal position; third, in novel mechanism for preventing rebound of the dials; fourth, in an improved mechanism for returning the indicating-dials to normal position; fifth, in improved mechanism for recording the amounts, times, and kind of sale, and for indicating the same; sixth, in improvements in the registering mechanisms; seventh, in an improved device whereby fraudulent manipulation of the keys in the "dollar" and "tens" rows, &c., may be prevented, and, finally, in certain other novel details of construction and combination of parts hereinafter clearly and fully described.

This invention is an improvement on the cash register and indicator for which Letters Patent of the United States, No. 458,143, were granted to me on the 18th day of August, 1891, and upon the cash register, indicator, and recorder for which I filed application for Letters Patent on the 19th day of September, 1891, Serial No. 406,205.

In my present case I have greatly simplified my former machines, notably in the following particulars: I omit the oscillating curved key-levers shown in my patent and application aforesaid and substitute therefor pull-straps, each of which not only serves as a means of releasing the drawer when a key is depressed, but also locks the key depressed and holds it down and simultaneously prevents any other key in the row being depressed until the corresponding indicating-dial is brought back to normal position. I also do away with type characters on the peripheries of the indicating-dials or on tires attached thereto and provide an independent type-wheel for each dial and operate it directly therefrom by gearing. I also employ a positive locking device for each of the sweeping arms.

In the drawings, A designates a central vertical shaft supported at bottom on the arm of an angular bracket $A^5$, depending from the top Z of the drawer-casing, on which the mechanisms are mounted. This shaft rises through the top, and its upper end is journaled in a bracket $x$ on the top of a framing X, upon which the gearing and registering-dials of the machine are mounted. On the lower end of shaft A is a gear-wheel $A'$, having a hub $A^7$ on its bottom, around which is coiled a spring $A^2$, one end of which is fast to the hub, the other end to bracket $A^5$, and by which shaft A is revolved in one direction. On the upper end of shaft A is keyed a bevel-gear $A^4$, which meshes with a similar gear B, keyed on a horizontal shaft $B'$, lying above and at right angles to shaft A and properly journaled in bearings on frame X. On this shaft B is fixed a circular dial $b$, upon the face of which are numbers "1, 2, 3, 4, 5, 6, 7, 8, 9," as indicated in the drawings. This dial is the "cents" or "units" dial.

C designates a tube loosely fitted on and shorter than shaft A, its lower end being supported on gear $A'$ and having a gear $C'$ and attached spring $C^2$, similar to gear $A'$ and spring $A^2$. On the upper end of tube C, just below gear $A^4$, is fixed a gear $C^3$, larger than gear $A^4$ and meshing with a similar bevel-gear D, loosely mounted on shaft $B'$ in rear of gear B.

$d$ is an annular dial much larger than dial $b$ and lying about concentric therewith, being attached to and supported on gear D by an arm $D'$, projecting radially from the gear, as shown. The faces of dial $d$ are numbered consecutively at regular intervals, as indicated in the drawings, and this dial is the dollar-dial.

E designates a sleeve shorter than tube C and loosely slipped thereon, being supported upon gear $C'$ and having a gear $E'$ and spring $E^2$, similar to gear $A'$ and spring $A^2$ above described.

On the upper end of sleeve E, just above top Z, is keyed a gear $E^3$, which meshes with a pinion $E^4$ on the lower end of a vertical shaft $E^5$, standing parallel with but behind shaft A, the lower end of which is journaled on top Z and its upper end in a bearing in a standard $X^2$, forming part of framing X, and in which the rear end of shaft $B'$ is also journaled.

$E^6$ is a bevel-gear on the upper end of shaft $E^5$, meshing with a similar gear F, loosely journaled on shaft $B'$ in rear of gear D.

$f$ is an annular dial smaller than dial $d$ and lying between it and dial $b$, the three dials being concentric to shaft $B'$ and lying in nearly the same plane. Dial $f$ is supported on gear F by a radial arm $F'$, as indicated in the drawings, arms $D'$ and $F'$ lying at opposite sides of dial $b$.

On the face of bevel-gear D is fixed or formed a pinion $D^3$, which meshes with a pinion $D^4$ (see Fig. 3) on the shaft of the first one of a train of adding-wheels $D^5$ $D^5$, of any suitable construction, mounted on the left-hand side of the machine in front of the dials and supported on framing X, as indicated in Figs. 1 and 3.

Secured to or formed on the rear face of bevel-gear B is a pinion $B^3$, which meshes with a pinion $B^4$ on the shaft of the first of a train of adding-wheels $B^5$ $B^5$, of any suitable construction, mounted at the right-hand side of the machine in front of the dials, as indicated in Figs. 1 and 2.

The train $D^5$ registers the totals of sales indicated by dial $d$, and train $B^5$ the totals of sales indicated by dial $b$.

On the upper end of sleeve E, above gear $E^3$, is keyed another gear $E^7$, which meshes with a pinion $e'$ on the lower end of a short vertical shaft $e^2$, beside and slightly in front of shaft A, the lower end of which is journaled in a bracket $x'$, projecting horizontally from the framing X, and its upper end is journaled in the top of the framing in front of and below train $B^5$, and on the upper end of shaft $e^2$ is mounted the first train of adding-wheels $e^5$, which lie in a horizontal position in front of the dial and below trains $D^5 B^5$, as shown in Figs. 1 and 2. Train $e^5$ gives the totals of sales indicated by dial $f$. The gearing between the dials and their respective adding or registering trains is so constructed that the adding-wheels are only operated when the dials revolve in one direction and are not affected when the dials revolve in a contrary direction to "0" position.

I use a row of keys for each indicating-dial, and, as shown, they are arranged in three tiers G $G'$ $G^2$, the first of which is smallest and uppermost and the last of which is largest and lowermost, all being concentric to shaft A. The keys are mounted in a shell-casting H, as shown, having three horizontal steps, and below each step is a horizontal inwardly-extending flange $H'$. The key-stems $g$ pass through corresponding openings in the steps and flanges, as indicated in the drawings, (see Figs. 1 and 6,) and each key-stem is vertically slotted, as at $g'$, and is normally upheld by a V or other spring $h$, one end of which is attached to the flange and the other to a stop-pin $g^2$ in the key-stem, by which the upward movement of the latter is limited.

I $I'$ $I^2$ designate three semicircular pull-straps resting on flanges $H'$ and respectively passing through the slots in the stems of the respective rows of keys G, G', and G², as shown. These straps have inclined slots I³ in them adjoining each key-stem, which slots are engaged by the pins g² of the stems when the keys are depressed. The extremities of the pull-straps are connected by transverse pieces i i' i², respectively, which are centrally pivoted on the sleeve C, as indicated in the drawings. When a key is depressed, its pin g' engages the slot I³ of the pull-strap passing through the key-stem, and naturally the pull-strap is moved lengthwise. All the slots in the straps are so formed that no matter what key in the row be depressed the pull-strap will be pulled in the same direction. The end of the pull-strap is, as hereinafter described, connected to the locking-bolt of the drawer, so that when the pull-strap is moved by the depression of a key the bolt will be lifted and the drawer released. When the pull-strap is shifted by the depression of any key in its corresponding row, the mouths of the slots in the straps are shifted out of line with the pins of the keys, so that no other key in that row can be depressed so long as the pull-strap remains shifted. At the same time the key depressed is held down so long as the strap remains shifted, because the upper edge of the slot extends over the pin g' of the stem and prevents the latter rising, as is evident. The bars i i' i² are to prevent the pull-straps spreading and to keep them properly centered or pivoted. The pull-straps, passing through slots in the key-stems, as described, prevent the latter rotating and guide them in their vertical movements.

It will be understood from the foregoing that I convert the downward motion of a key-stem into a horizontal motion of the pull-strap or the downward pressure of the key into a longitudinal pull on a horizontal bar. This would be more readily understood if the keys, instead of being arranged concentrically, as they are for the sake of compactness, were arranged in a straight line. The pull-strap must extend under the keys, however, and therefore has to be curved when the keys are arranged in a semicircle.

The construction described, while being effective and economical, is not by any means the only way to convert the vertical motion of the stem into a horizontal motion of the strap, and I do not confine myself to such construction, as various other constructions may be used and devised for effecting the end desired without departing from the essential features of this part of my invention.

a is a radial arm connected to the upper end of shaft A and extending downwardly and outwardly, its extremity lying below the upper flange H'. c is a similar arm rigidly connected to tube C, its extremity underlying the middle flange H', and e is a similar arm rigidly connected to sleeve E, its extremity underlying the lowest flange H'. These arms can or move in a semicircle as the shafts revolve; but if a key in the corresponding row be depressed the extremity of the arm will strike the lower end of the key-stem and its movement, and consequently the revolution of the corresponding dial, be thereby stopped, substantially as in my patent above mentioned. The arms a and c are looped or slotted, as at a' c' to enable their extremities to move past shaft e² without striking the latter.

J, J', and J² are bell-crank levers pivoted at their bends on a rod J⁴, secured between ears on the top Z at the right-hand side of the machine. The upstanding arm of lever J is pivotally connected by a link j to the adjoining end of pull-strap I, and the upstanding arms of levers J' J² are respectively similarly connected to the ends of straps I' I², as shown. The short horizontal arms of said levers underlie a presser-bar K, which is hinged on rod J⁴ by end pieces K² K².

K³ is an arm projecting from the end of bar K and pivotally connected to the upper end of a vertically-movable bolt K⁴, which plays through an opening in top Z and depends into the drawer-space in position to engage a keeper K⁵ on the side of the drawer, whereby upon the oscillation of either lever J J' J² the presser-bar is raised and the bolt disengaged from the keeper, releasing the drawer. A spring K⁶, secured to the top, is employed to normally hold down bar K, and consequently the short arms of the levers; but, if desired, an independent spring may be employed for each lever. By this construction the shifting of either pull-strap will cause the release of the drawer, which as soon as the bolt is disengaged therefrom is thrown outward by springs concealed beneath its bottom. The drawer is also provided with a rack engaged by a dog on the side of the casing, so that it must be entirely opened to a certain extent before it can be closed, and vice versa, substantially as in my patent aforementioned.

L L designate blocks depending from the ends of flanges H', adjoining levers J, J', and J², said blocks being cut away at their top and inner sides, as at L', and l l are bolts playing through openings in the blocks and having pins l' fixed to their sides, projecting through vertical slots L² in the inner sides of blocks L, as shown.

j' are arms attached to or formed on the upstanding portions of levers J J' J², extending forwardly beside the adjoining blocks L, as shown, and diagonally slotted, as at j³, and through these slots pass the ends of pins l', as shown, so that as the levers J J' J² are rocked or vibrated the bolts l will be raised or lowered as pins l' ride up and down on the inclined slots.

When the dials are at "0" position, the ends of the respective arms a c e lie in recesses L' of the blocks behind the bolts l, which are raised as the levers J J' J² are shifted farthest from the blocks. Now when any key is depressed its pull-strap moves and draws forward the upper end of the bell-crank lever to which it is connected, releasing the drawer, as described, and at the same time the arm of the lever depresses the bolt *l*, thereby releasing the arm of the dial, which sweeps around until its movement is arrested by the end of the depressed key-stem, and the gearing is so calculated that the dial related to the sweeping arm is revolved until the figure corresponding with the number of the key depressed appears at the sight-opening. The parts are so constructed that the lever J, J', or J² and pull-strap cannot move back to normal position until the sweeping arm has swung back of the locking-bolt. Then the pull-strap and lever are quickly thrown back to normal position and the bolt *l* raised in position to lock the sweeping arm until another key in the same row is depressed.

In order to lock the levers and pull-straps when shifted, so that the key depressed cannot rise nor others in the same row be depressed, as above set forth, I employ, as shown, three latch-plates M M' M², which lie transversely of and beneath the horizontal arms of the levers J, J', and J², and each plate has an upstanding lug M formed on its upper edge and projecting beside its respective lever-arm, as shown in Figs. 4 and 8. M⁵ M⁵ are coiled springs connected to the several latch-plates and adapted to draw them inward, so that when the lever is shifted by the movement of a pull-strap, thereby lifting its horizontal arm, the corresponding latch-plate is drawn forward until its lug M⁴ underlies the horizontal arm, and it is then impossible for the lever to return to normal position until the latch-plate is thrown back. The latch-plates lie side by side in a grooved block M⁶, underlying bar K, and are guided and retained in position thereby. The latch-plates are shifted beneath the lever-arms as the drawer closes by means of a swinging arm *m*, fixed to a stub-shaft *m'*, journaled in a vertical opening in the top plate Z, the end of arm *m* resting in notches M⁸ in the lower edges of the latch-plates, and when the arm is swung it moves said plates longitudinally. On the lower end of shaft *m'* is a trip-arm *m²*, which lies in the drawer-space and projects in the path of the side of the drawer in position to be engaged by a shoulder *m⁷* in the keeper K⁵, as shown, and be shifted thereby as the drawer closes just as the keeper presses inward beneath the drawer-locking bolt. The connections between levers J J' J² and bolts *l* may also be varied, and I do not confine myself to the slotted arms and pins for operating said bolts, as other devices could be readily devised for shifting them at the proper moment.

In order to prevent keys in different rows being successively depressed, I employ a locking device, whereby when a key in one row is depressed the pull-strap in the adjoining row or rows will be dogged or locked, so that the drawer must be closed before a key in another row can be depressed. However, the locking device will not interfere with the simultaneous depression of keys in different rows. The object of this locking device is to prevent "beating" of the machine by dishonest employés. For instance, suppose a twenty-five cent sale had been made and the twenty-five cent key in the lowest row depressed, thereby releasing the drawer, and "25" being displayed at the sight-opening. If then a one-dollar-and-twenty-five-cent sale was made by the same employé without closing the drawer, he might depress the one-dollar key in the second row and "$1.25" would be displayed at the sight-opening, as the "tens-dial" had not been returned to normal position and he could embezzle the twenty-five cents without being detected by the customer and only "$1.00" being registered in the machine. To prevent this I use the locking device, which consists of a vertically-movable stepped rod N, suitably upheld and guided and lying between the lever J and the end of key-bank. This rod extends up and is bent horizontally opposite the end of each flange H' and has attached to it forwardly-extending arms N', which underlie the projecting ends of the pull-straps, as shown.

*n n* are short studs on the ends of arms N', adapted to engage openings or notches *n²* in the ends of the pull-straps adjoining the levers when the rod is lifted.

Rod N is provided with rearwardly-extending arms N³ N³, which are adapted to contact with studs *n³* on the levers J J' J², respectively, when the latter are moved inward, thereby causing rod N to rise upon the shifting of either lever. In the drawings I have shown the rod N extending beside each row; yet it is hardly necessary to lock the uppermost row. Now supposing a key in the lowest row to be depressed, lever J is rocked forward, and rod N is consequently lifted also. The lowest pull-strap is moved forward by the depression of the key, so that opening *n²* therein is out of line with the stud *n* of the lowest arm N'. Consequently the moving pull-strap is not locked. The pull-straps in the second and third rows, however, being unshifted, the arms N' thereunder as they move upward cause the studs *n* thereof to engage with the pull-straps, and thereby lock the same, as is evident, so that it is impossible to shift the pull-strap in the second or third row, and consequently shift the dials thereof, until the pull-strap in the lower row is shifted back, and as the latter cannot be shifted until the drawer is closed cheating is prevented. If a key in the second or third row be depressed first, the pull-strap of the other rows will be similarly locked.

It will be readily understood how the device may be so arranged as to lock any number of pull-straps in a bank except the one first shifted. Of course if the keys in the banks be simultaneously depressed the straps are shifted so that openings $n^3$ are out of line with studs $n$, and consequently no locking of the straps will be effected. Hence it is possible to easily indicate and register dollars and cents at each opening of the drawer. Rods N might be raised by inclined lugs on the projecting ends of the pull-straps engaging similar oppositely-inclined lugs on the rod. I do not wish to confine myself to the precise means shown for actuating the rod. Arms N' might be spring-arms, or studs $n$ might be replaced by spring-upheld bolts to prevent breakage should the arm stud or bolt contact with a moving pull-strap.

O designates a plate secured to the under side of top Z and lying in the drawer-space to one side of the gears A' C' E' and extending in rear thereof. This plate has three longitudinal grooves O' in its face adjoining and in the same plane as the gears.

$O^2$ designates sliding rack-bars meshing, respectively, with gears A' C' E' and loosely confined in said grooves.

When the dials are shifted as described, the racks $O^2$ are thrown forward, respectively, by the revolution of the gears A' C' E' as the springs on the gears unwind as the drawer is opening. As the drawer is closed a stud $O^3$, fixed to the bottom of the drawer, engages the forward ends of racks $O^2$ and pushes them back, thereby turning the gears A' C' E' backward, winding their springs thereon and through their connected gearing shifting the indicating-dials back to normal position, substantially as set forth in my aforesaid application and patent.

In order to prevent rebound of the gears and dials if such should occasion false registering and indicating, I have provided dogging devices for the gears A' C' E', which are controlled by the movement of the drawer also, as follows:

$o$ $o$ designate bell-crank pawls pivoted at their bends on a hanger $O^4$, depending from the top Z. Each pawl lies beside and just above one of the gears A' C' E' and has a dogging arm $o'$, overlying the adjoining gear and adapted to engage a ratchet $o^6$, fixed to the top thereof, and $o^2$ are springs adapted to normally hold the arm $o'$ in engagement with the ratchets. (See Figs. 11 and 12.) Each pawl has an arm $o^3$, extending about at right angles to arm $o'$, beside and just above the edges of adjoining rack-bar $O^2$.

$O^5$ are metal strips resting on the rack-bars, respectively, and sliding therewith, normally projecting slightly beyond the front ends of the rack-bars, and having diagonal slots $o^4$ $o^4$, engaging pins $o^5$ $o^5$ on the rack-bars, so that when the strip is pushed in longitudinally over the rack-bar it is first caused to move laterally over the bar toward the gears.

$O^6$ $O^6$ are springs connected to the strips and rack-bars and adapted to normally hold the strips projected beyond the ends of the rack-bars. Now when a rack-bar is thrown forward by the spring-impelled rotation of the gear with which it meshes it carries forward the strip also, and the arm $o'$ of the pawl in engagement with the ratchet of said gear prevents any rebound thereof. As the drawer is moved inward, however, stud $O^3$ first strikes the projecting end of the strip and forces it backward over the rack-bar until the stud strikes the end of the rack-bar, when both bar and strip are moved inward together. The movement of the strip, however, causes it to first shift laterally on the rack-bar and in so doing its inner edge strikes the arm $o^3$ of the pawl and rocks the latter, so as to throw its dogging-arm $o'$ out of engagement with the ratchet before the rack-bar is moved inward. The gear is therefore freed from the pawl and can be revolved by the rack-bar as the drawer closes. The instant the drawer starts forward the strip is thrown forward by springs $O^6$ and drawn laterally away from the gears, thereby permitting spring $o^2$ to throw arm $o'$ into engagement with the ratchet on the gear.

The recording devices are as follows: P designates a shaft journaled in proper bracket-arms or extensions of framing X and lying above the registering-wheels and to the left of the indicating-dials, and on it are loosely mounted three type-wheels $b^3$ $d^3$ $f^3$, on the perimeters of which are type characters corresponding to the characters on the faces of the indicating-dials. Wheel $b^3$ has a pinion $b^4$ fixed to one side and engaged by one end of a toothed rack-bar $b^5$, the other end of which meshes with a pinion $b^6$, secured to pinion B on shaft B', as shown, so that motion is imparted to wheel $b^3$ from the shaft B'. Wheel $d^3$ is operated by a pinion $d^4$, meshing with a rack $d^5$, which in turn meshes with a pinion $d^6$, fixed to gear D, and wheel $f^3$ is operated by a pinion $f^4$ and rack-bar $f^5$ from a pinion $f^6$ on the hub F. The gearing bearing the respective dials and their type-wheels is so calculated that when a dial is shifted the corresponding type-wheel will be similarly shifted, so as to bring into printing position a type character thereon corresponding to the character displayed on the dial at the "sight-opening" of the machine, and when the dials are thrown back to "0" position the type-wheels are shifted accordingly. Q designates a platen pivoted below and to one side of the type-wheels and close to the periphery thereof and having an arm Q', pivotally connected to the upper end of a push-rod $Q^2$, which depends into the drawer-space, its lower edge being beveled or rounded, so as to engage and ride up on a lug on the side of the drawer, (not shown,) so placed that as the drawer starts open the push-rod is lifted and the platen pressed against the type thereon. $Q^4$ is a spring for holding down the platen and rod.

$q$ designates an inking-fountain located just above the platen and having an inking roller or brush in its mouth, which supplies ink to the type on the wheels as the latter revolve thereagainst. R is a paper-roll supported in bearings on top Z below the type-wheels, the paper being led therefrom up over a roller R', thence between the perimeters of the type-wheels and platens over another roller R², and thence to a paper-spool R², lying below the type-wheels. A ratchet r is fixed on the end of this spool and is engaged by a spring-dog r', attached to rod Q², so that each time the rod drops a fresh portion of the paper strip is drawn from the roll between the platen and wheels and wound on the spool. The spool should be so constructed that the paper strip may be easily attached to and removed therefrom, so that the records of sales may be separated and removed daily.

If it is desired to keep account of each clerk's sales without employing checks, I provide a type-wheel P', fixed on shaft P in rear of the other wheels and having on its periphery either numbers or letters, each clerk being given a number or letter. I affix to the front end of the shaft a pointer-hand P², by which the shaft may be rotated, and on the outer face of the casing I have an index or indicator row of numerals or letters corresponding to those on wheel P'. The clerk who makes a sale before depressing any key shifts the pointer to the notch opposite his number or letter on this index, thereby turning the shaft until the corresponding character on wheel P' is brought into printing position, as will be readily understood from the drawings. By this arrangement a record may be kept of each clerk's sales, together with the amount thereof.

It may also be desired to keep account of the kinds of goods sold where the machines are used in stores selling only certain kinds of goods, and to do this I employ another type-wheel S, (see Fig. 10,) fixed on a sleeve S', loosely surrounding shaft P and forming, perhaps, the journal-bearing for the front end thereof, and on the end of this sleeve, outside the casing, but in rear of pointer P², is a finger-wheel S², by which the wheel S can be turned. S³ is a dial attached to sleeve S' and having the names of goods printed on its face, and the dial can be shifted to bring the name of goods opposite a pointer or sight-opening, and when so shifted the proper type characters on wheel S will be brought into printing position. All the type-wheels being equal in diameter and centered on the same shaft, it is evident that an impression can be taken from one or all the wheels by the same platen and at one movement thereof with great ease. I do this by simply extending the platen, paper-rolls, and inking-rolls.

It is frequently desirable to time each sale, and this I effect as follows: T represents an ordinary clock mounted at the side of the dials opposite shaft P and in line therewith. The hour-hand shaft T' of the clock is extended in rear thereof, as shown, and on its face is fixed a sprocket or belt wheel T², over which runs an endless belt T³, which is provided with numerous type characters to indicate the division of the day into hours and minutes. This belt extends across behind the dials and over a similar wheel T⁴ on shaft P in rear of the other wheels and in line therewith and of such diameter that the type on belt T³ from which an impression is to be taken will be in line with the type on the other type-wheels when they are in printing position. The lower side of the belt runs under a slack-roller t, controlled by springs t' by which the belt is kept sufficiently taut.

From the foregoing description and drawings it will be seen that the time and amount of sale, the kind of goods sold, and the seller may all be recorded together by one recording mechanism on a single record-strip.

If it is not desired to record or indicate the kind of goods sold, the days of the month may be put on wheel S and dial P³, so that the day of month, as well as the time of day, may be recorded, or the day of month may be placed on wheel P' or on an additional type-wheel mounted on shaft P.

Type characters indicating "charge," "credit," "on account," "repayment," "change," &c., may be put on wheel S or P' or on additional wheels mounted on shaft P, as is obvious, so that a complete record may be kept of all the financial transactions of the day, either cash or credit sales, payment on account, &c., the time thereof, and the employé conducting them.

The record mechanism may be operated independently of the drawer, if desired, and I do not intend to confine myself to precise means for inking the type-wheels and taking an impression therefrom herein described, as various modifications might be made therein which would be easily contrived or adapted by a mechanic and would be needless here to describe, as I have shown one operative form of complete machine.

Operation: When the parts are in normal position, the dials b f d and the type-wheels stand at "0" position, the drawer is closed and locked, and the arms a c e are each locked by its respective bolt l'. Upon the depression of a key in either bank it shifts the corresponding pull-strap, thereby rocking the connected lever J, J', or J², which lifts bar K and bolt K⁴, thereby releasing the drawer, and at the same time bolt l' is drawn and the arm a c e released, thus permitting the shaft to which said arm is attached to be revolved by the spring on its lower end and the corresponding indicating-dial to be shifted until the arm strikes the stem of the depressed key and is stopped, thus stopping the dial. The printing type-wheel for the dial is also revolved by the gearing from the dial, so as to bring the proper type thereon, corresponding to the character on the depressed key and as displayed on the dial at the sight-opening, into printing position. The type-wheels P' and S may be shifted by hand previous to the depression on the key, and the time-belt T³ is of course shifted by the clock. Then as the drawer opens the lug thereon lifts rod $Q^2$, which operates platen Q and takes an impression on the record-strip. As bar K rises one of the locking-plates M, M′, or $M^2$ is shifted so as to uphold said bar and bolt $K^4$. The locking-bar N′ being raised by the shifting of either pull-strap will lock the other unshifted pull-straps, as described, so that they cannot be shifted until the parts are thrown back to normal position. When the drawer closes, the stud therein engages the forward end of the sliding rack-bar $O^2$, meshing with the gear E′, C′, or A′ on the lower end of the shaft which has been shifted, and forces said rack-bar inward, thereby returning said shaft and its arm to normal "0" position, and the stud $K^5$ on the drawer engages and operates rock-arm $m^2$, and the locking-plate M, M′, or $M^2$ is thrown back, plate K and bolt $K^4$ fall, locking the drawer and throwing crank-lever J, J′, or $J^2$ back, which in turn draws the pull-straps back, letting the depressed key rise and raising bolt l′ to lock the arm a, c, or e. The parts are then in position to repeat these series of operations upon the depression of any key.

Having described my invention, what I claim as new, and desire to secure by Letters Patent thereon, is—

1. The combination of a vertical shaft, a gear and ratchet thereon, a sliding rack-bar meshing with said gear, a pawl engaging said ratchet, and a movable stud adapted to push said rack-bar in one direction, and mechanism for automatically disengaging the pawl and ratchet before the stud moves the rack-bar, substantially as specified.

2. The combination of a shaft, a gear and ratchet thereon, a sliding rack meshing with said gear, and a pawl engaging said ratchet with a strip connected to and movable with said rack-bar and laterally movable thereon, whereby when the strip and rack-bar are pushed inward the pawl is disengaged from the ratchet, substantially as described.

3. The combination of a spring-controlled shaft, a ratchet and gear thereon, a sliding rack-bar meshing with said gear, and a bell-crank pawl adapted to engage said ratchet with a spring-controlled strip loosely connected to said rack-bar and sliding therewith, but laterally movable thereon, adapted to disengage said pawl from the ratchet when it and the rack-bar are pushed inward, and a sliding drawer having a stud adapted to engage and move the rack-bar and strip in one direction, substantially as specified.

4. The combination of a slotted key-stem, and an angularly-slotted pull-strap extending past the key-stem, and a pin in the slot of the stem engaging the slot in the strap, substantially as set forth.

5. The combination of a semicircular series of slotted key-stems, and an angularly-slotted curved pull-strap extending along the series of key-stems, and pins in the slots of the stems engaging the slots in the straps, with a movable drawer, a locking device therefor, and connections between said locking device and pull-strap, substantially as and for the purpose set forth.

6. The combination of a slotted key-stem, and an angularly-slotted pull-strap extending through the key-stem, and a pin on the stem engaging a slot in the strap, with a movable drawer, a locking device therefor, and connections between said locking device and pull-strap, whereby when the drawer is closed the pull-strap is brought back to normal position, substantially as described.

7. The combination of a drawer, vertically-movable bolt, a key-stem, and a pull-strap operated from said stem with a pivoted bell-crank lever interposed between the bolt and pull-strap for operating said bolt from said strap, substantially as specified.

8. The combination of the drawer and a pull-strap, a bolt, a hinged bar connected thereto, a bell-crank lever having one end underlying said bar and its other end connected to the pull-strap, and a depressing-spring, substantially as described.

9. The combination of a bolt, a hinged bar connected thereto, a bell-crank lever for lifting said bar, and a depressing-spring, and a dogging device for locking said lever when the bolt is raised, substantially as described.

10. The combination of a drawer-bolt, a key-stem, and a pull-strap operated from said stem with a bell-crank lever interposed between the bolt and pull-strap for operating said bolt from said strap and a sliding dogging-plate arranged to lock said lever when the bolt is lifted, substantially as set forth.

11. In a cash-register, the combination of a drawer, a locking-bolt therefor, a series of key-stems, mechanism for raising and locking said bolt upon the depression of a key-stem, and thereby releasing the drawer and locking the depressed key, and mechanism whereby the bolt and stem are released when the drawer is closed, substantially as described.

12. The combination of the drawer, a locking-bolt therefor, a bell-crank lever and connections for operating said bolt, and key-stems and connections for shifting said lever with a spring-controlled latch-plate adapted to lock said lever when the bolt is raised and mechanism operated by the drawer in closing for disengaging said latch-plate and lever, substantially as set forth.

13. The combination of a bolt, a hinged bar connected thereto, a bell-crank lever for lifting said bar, and a depressing-spring and a dogging device for locking said lever when the bolt is raised, a pivoted arm for disengaging said dogging device, and a movable drawer adapted to shift said arm in closing, substantially as specified.

14. The combination of a drawer-bolt, a key-stem, and a pull-strap operated from said stem with a bell-crank lever interposed between the bolt and pull-strap for operating said bolt from said strap, and a sliding dogging-plate arranged to lock said lever when the bolt is lifted, and a swinging arm engaging said plate and connected to a crank-arm in the drawer-space, arranged to be shifted by the drawer in closing, substantially as and for the purpose described.

15. In a cash-register, the combination of a drawer-bolt, a hinged presser-bar connected thereto, a pivoted bell-crank lever having an arm underlying said bar, the series of key-stems and connections between the same and upstanding arm of the bar, and a latch-plate underlying said bar and end of lever, and the spring and swinging arm for shifting said plate, substantially as described.

16. In a cash-register, the combination of a drawer, its locking-bolt, and a hinged presser-bar connected thereto with a series of key-stems, a pull-strap operated thereby, a pivoted bell-crank lever having one end linked to the end of the strap and the other underlying the bar, the latch-plate underlying said lever, the spring and swinging arm for shifting said plate, and the rock-shaft and crank-arm therein adapted to be struck and shifted by a lug on the drawer, substantially as set forth.

17. In a cash-register, the combination of the drawer-bolt, a hinged bar connected thereto, a series of bell-crank levers adapted to independently lift said bar, and the row of key-stems, and connections between the respective rows of stems and levers, and the independent locking-plates for locking the levers when the bar is shifted so as to disengage the bolt, substantially as set forth.

18. The combination of the presser-bar, the series of bell-crank levers pivoted beside and adapted to lift the same when shifted, the rows of key-stems, the pull-straps operated therefrom, and the connections between the upper ends of the levers and the pull-straps with the dogging-plates for the levers and the springs and swinging arm for shifting said plates, substantially as and for the purpose specified.

19. The combination of the revoluble shaft, the arm connected thereto, and the bolt for locking said arm in normal position, and key-stems, pull-straps, and connected mechanism for shifting said bolt to release the arm, substantially as described.

20. The combination of a revoluble shaft, its stop-arm, and the bolt for locking said arm in normal position with the key-stems and mechanism operated therefrom, whereby the bolt is disengaged from the arm when a key is depressed, substantially as set forth.

21. The combination of the revoluble shaft, its stop-arm, and a locking-bolt therefor with a pivoted lever and connections for shifting said bolt and a key-stem and connections for shifting said lever, substantially as and for the purpose specified.

22. The combination of a movable drawer, a revoluble shaft, its arm, and a locking device engaging said arm to hold it in normal position with mechanism for releasing the arm, and devices for keeping said bolt retracted while the drawer is open and for projecting it to lock the arm when the drawer closes, substantially as described.

23. The combination of the revoluble shaft, its stop-arm, and a locking-bolt therefor with a pivoted lever and connections for shifting said bolt, and a key-stem and connections for shifting said lever to release the bolt, a dogging device for locking said lever when shifted from the key-stem, and a movable drawer and mechanism whereby upon the closing of the drawer the lever is thrown back to normal position, substantially as described.

24. The combination of the vertical shaft, its locking-arm, the indicating-dial operated by said shaft, the bolt for locking said arm, and thereby the dial and shaft, in normal position, a series of key-stems and connections for shifting said bolt to release the arm, a movable drawer, and mechanism operated by said drawer whereby upon the closing of the drawer the shaft and dial and arm are brought back to normal position and the bolt caused to lock the arm, substantially as set forth.

25. The combination of a series of parallel key-stems arranged in a semicircular row, a curved pull-strap engaged by said stems, and a centrally-pivoted bar uniting the ends of said strap with a drawer-locking device connected to one end of said strap, substantially as described.

26. The combination of a movable drawer, a locking device therefor, an indicating-dial, a vertical shaft and gear for operating the same, a radial arm attached to said shaft, a series of key-stems adapted to arrest the movement of said arm, a locking device for holding said arm in normal position, a curved pull-strap engaged by said keys adapted to shift the said locking devices when a key is depressed to release the drawer and locking-arm, and a bar fulcrumed on said shaft and connecting the extremities of said pull-strap, substantially as and for the purpose specified.

27. The combination of a vertical shaft or sleeve, an indicating dial driven therefrom, a horizontal set of registering-wheels above said shaft, a second vertical shaft connected to the first registering-wheel, and the pinion on the lower end of said shaft engaging a gear on the first shaft, substantially as described.

28. The combination, in a cash register, indicator, and recorder, of an indicating-dial, a type-wheel loosely journaled on a shaft beside the dial and driven by gearing therefrom, and a type-wheel fixed to said shaft, means for revolving said shaft by hand to shift said wheel, a sliding drawer and paper-feed devices, and a platen and a push-rod operated by the drawer for taking a record from the type on both wheels, substantially as described.

29. In a cash register, indicator, and recorder, the combination of an indicating mechanism, a shaft journaled beside the same, a type-wheel fixed thereon, and means for revolving said shaft by hand with a type-wheel loosely journaled on said shaft and operated from the indicating mechanism, and an endless belt running over a pulley loosely journaled on said shaft, driven by clockwork, and bearing a series of type time characters, and mechanism, substantially as described, for taking an impression from the type on the wheels and belt upon a record, substantially as described.

30. In a cash register, indicator, and recorder, the combination of mechanism for recording the amount of each sale with independent hand-operated devices, substantially as described, for simultaneously indicating on the record the person by whom the sale is made, and a type-bearing belt driven by a clock mechanism for recording the time of such sale, and means for recording also the kind of goods sold, substantially as and for the purpose set forth.

31. In a cash register, indicator, and recorder, the combination of indicating mechanism and type-wheels driven therefrom by racks and pinions for recording the amount of each sale, independently-operated type-wheels for recording the number of the person making the sale and the kind of goods sold, and the type-belt driven by clockwork for recording the time of each sale with a sliding drawer and mechanism, substantially as described, operated thereby for simultaneously producing an impression from the type on the several wheels and belt upon a record-strip, substantially as described.

32. In a cash-register, the combination of a pair of independent indicators, and independent rows of keys, and a pull-strap for each row of keys operated thereby and respectively connected to one of the indicators, and means, substantially as described, whereby when one pull-strap is shifted the other will be locked unless simultaneously moved, substantially as described.

33. In a cash-register, the combination of independent rows of keys, a pull-strap for each row, and the levers respectively connected to the straps, each adapted to release one of the indicating mechanisms when shifted, with a locking device operated by either lever, whereby when one pull-strap is shifted the other will be locked, yet is so arranged that both may be shifted together, substantially as specified.

34. The combination of the pull-straps and the key-stems for shifting them with the locking-rod, its arms underlying the ends of pull-straps and adapted to engage and lock the straps, and means for shifting said rods from the straps, so that when either pull-strap is shifted by the depression of one of its actuating-keys the other strap will be locked unless one of its keys be simultaneously depressed, substantially as described.

35. In a cash-register, the combination of a drawer-bolt, a hinged bar connected thereto, a series of bell-crank levers, each having one end underlying and adapted to independently lift said bar, the pull-straps connected thereto and to the rows of key-stems, and independent connections between the respective pull-straps and the respective levers, substantially as described.

36. The combination of a series of parallel key-stems arranged in a curved row with a slotted curved pull-strap set edgewise and having a series of upwardly-inclined slots respectively engaged by the several keys and its ends connected by a cross-bar, substantially as and for the purpose specified.

In testimony that I claim the foregoing as my own I affix my signature in presence of two witnesses.

CHARLES F. BROWN.

Witnesses.
THOS. RAYNER,
J. P. SANDERS.